US007870273B2

(12) United States Patent
Watson et al.

(10) Patent No.: US 7,870,273 B2
(45) Date of Patent: Jan. 11, 2011

(54) METHOD AND SYSTEM FOR INDENTIFYING A DEVICE IMPLEMENTING A DIGITAL RIGHTS MANAGEMENT PROTOCOL

(75) Inventors: Scott F. Watson, Marina Del Rey, CA (US); Arnaud Robert, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 305 days.

(21) Appl. No.: 11/906,139

(22) Filed: Sep. 28, 2007

(65) Prior Publication Data

US 2009/0089884 A1    Apr. 2, 2009

(51) Int. Cl.
    *G06F 15/16* (2006.01)
(52) U.S. Cl. .................. 709/229; 709/217; 709/223; 709/225; 726/27; 726/28; 713/165; 713/189
(58) Field of Classification Search .............. 726/4, 726/26–28, 30; 713/165, 168, 189; 709/229, 709/217, 223–226, 230; 705/57–59
    See application file for complete search history.

(56) References Cited

U.S. PATENT DOCUMENTS

| 7,278,165 | B2 * | 10/2007 | Molaro ..................... 726/27 |
| 7,533,061 | B1 * | 5/2009 | Cheng et al. ................. 705/57 |
| 7,555,464 | B2 * | 6/2009 | Candelore ................... 705/57 |
| 2004/0158712 | A1 | 8/2004 | Lee et al. |
| 2006/0080529 | A1 | 4/2006 | Yoon et al. |
| 2007/0061886 | A1 * | 3/2007 | Le ............................ 726/26 |
| 2007/0112681 | A1 | 5/2007 | Niwano et al. |
| 2007/0130076 | A1 * | 6/2007 | Park et al. ................... 705/57 |
| 2008/0015888 | A1 * | 1/2008 | Dang et al. .................. 705/1 |
| 2008/0047006 | A1 * | 2/2008 | Jeong et al. ................ 726/21 |
| 2008/0126248 | A1 * | 5/2008 | Lee et al. .................... 726/28 |
| 2008/0140433 | A1 * | 6/2008 | Levy et al. ................... 705/1 |
| 2008/0250508 | A1 * | 10/2008 | Montague et al. ........... 726/28 |
| 2008/0313264 | A1 * | 12/2008 | Pestoni ..................... 709/202 |
| 2009/0132811 | A1 * | 5/2009 | Koster et al. .............. 713/156 |
| 2010/0161781 | A1 * | 6/2010 | Nam et al. ................ 709/223 |

FOREIGN PATENT DOCUMENTS

| EP | 1416406 | 5/2004 |
| EP | 1645933 | 4/2006 |

OTHER PUBLICATIONS

Wikipedia, "Cryptographic nonce", entry created Sep. 2006, accessed from: [http://en.wikipedia.org/wiki/Cryptographic_nonce].*

* cited by examiner

*Primary Examiner*—Ramy M Osman
(74) *Attorney, Agent, or Firm*—Farjami & Farjami LLP

(57) ABSTRACT

A system and method is provided for identifying electronic devices belonging to the same authenticated user to allow access to shared media even if the electronic devices use incompatible digital rights management (DRM) schemes. By providing a method of registering electronic devices in a centralized rights server database, a user can acquire DRM licenses for the appropriate electronic device by simply registering the electronic devices. When the user later requests a DRM license, it only needs to provide cryptographic proof of a UID, or unique identifier, assigned to the device by the rights server. In this manner, media can he shared across devices Using incompatible DRM schemes.

22 Claims, 3 Drawing Sheets

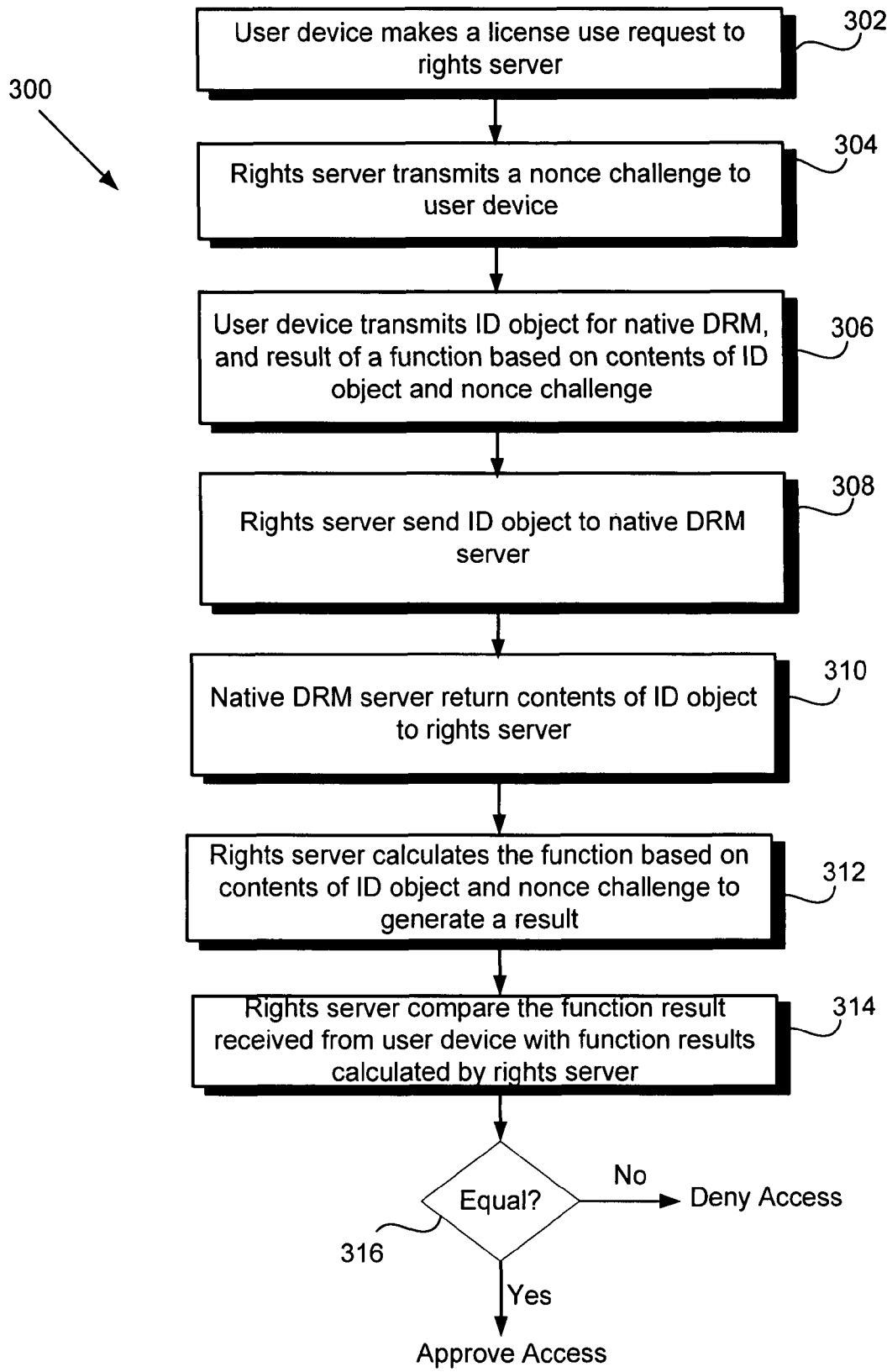

METHOD AND SYSTEM FOR INDENTIFYING A DEVICE IMPLEMENTING A DIGITAL RIGHTS MANAGEMENT PROTOCOL

BACKGROUND OF THE INVENTION

1. Field of the Invention

The present invention relates generally to digital rights management ("DRM"). More particularly, the present invention relates to techniques for managing devices implementing various DRM protocols.

2. Background Art

A DRM protocol is a term that refers to any technological technique for controlling access to copyrighted content. The content can be, for example, a digital image, a video recording, or a music file. A DRM protocol is implemented in either software or hardware and generally includes components that are part of the application or electronic device using the content. Thus, a DRM protocol can be implemented by a DRM module that resides in the application or in the electronic device using the content.

For example, a DRM protocol used by a content provider might involve encrypting the content requested by a consumer and transmitting the encrypted content to an electronic device belonging to the consumer. Once the electronic device attempts to use or access the encrypted content, a DRM module implementing the DRM protocol may request a license from a predetermined license server. In response to this request, the license server can generate a license (also referred to as a "rights object"), which specifies the allowable uses of the content and which includes the decryption key for decrypting the encrypted content. The allowable uses for the content can be specified by the content provider and stored on the license server. The rights object can then be transmitted to the electronic device, thereby allowing the DRM module to decrypt the encrypted content and to permit the electronic device to use the content in accordance with the allowable uses specified by the rights object.

Thus, it is critical for the license server to properly identify the electronic device prior to transmitting the rights object in order to prevent unknown or unauthorized electronic devices from using the content. Today, a single user may use a number of different electronic devices to access the license server. As such, a more flexible licensing approach is needed that allows the user to conveniently share the content among her various electronic devices. However, since various electronic devices can implement various DRM protocols, conventional license servers configured for one DRM protocol cannot properly identify electronic devices implementing various other DRM protocols.

SUMMARY OF THE INVENTION

There are provided methods and systems for identifying a device implementing a DRM protocol, substantially as shown in and/or described in connection with at least one of the figures, as set forth more completely in the claims.

In one aspect, there is provided a method for use by a system for digital rights management ("DRM") of a plurality user devices. The method comprises receiving a user ID associated with a user for accessing the system; receiving a first device ID request from the user for registration of a first user device; generating a first unique identification number for the first user device; generating a first unique identification object based on a first DRM protocol, the first unique identification object including the first unique identification number; associating the user with the first user device, the first unique identification number and the first DRM protocol; receiving the user ID associated with the user for accessing the system; receiving a second device ID request from the user for registration of a second user device; generating a second unique identification number for the second user device; generating a second unique identification object based on a second DRM protocol, the second unique identification object including the second unique identification number, wherein the first DRM protocol and the second DRM protocol are incompatible; and associating the user with the second user device, the second unique identification number and the second DRM protocol.

In a further aspect, the method further comprises transmitting the unique identification object to the first user device. In an additional aspect, the method also comprises receiving the unique identification object from the first user device; receiving a first result of a function applied to the unique identification number; unlocking the unique identification object; applying the function to a content of the unique identification object to obtain a second result; comparing the first result with the second result; and approving access to the first user device if the comparing matches the first result with the second result. In one aspect, the first DRM protocol may be an Open Mobile Alliance Digital Rights Management ("OMADRM") protocol and the second DRM protocol may be a Windows Media Digital Rights Management ("WMDRM") protocol.

In yet another aspect, the first unique identification object is encrypted with a unique identification encryption key, and wherein unlocking the unique identification object includes using the unique identification encryption key. In one aspect, the method further comprises receiving a DRM license object request from the first user device; verifying the first user device; and transmitting a DRM license object to the first user device for unlocking the first unique identification object, where the first unique identification object is encrypted with a unique identification encryption key, and wherein DRM license object includes the unique identification encryption key, and where prior to receiving the DRM license object request, the method may comprise transmitting the unique identification object to the first user device; transmitting a rendezvous code to the first user device; and receiving the rendezvous code from the first user device, where the verifying includes confirming the rendezvous code.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 illustrates a flowchart for performing a method for validating a device implementing a DRM protocol, in accordance with one embodiment of the invention.

DETAILED DESCRIPTION OF THE INVENTION

Figure 1:
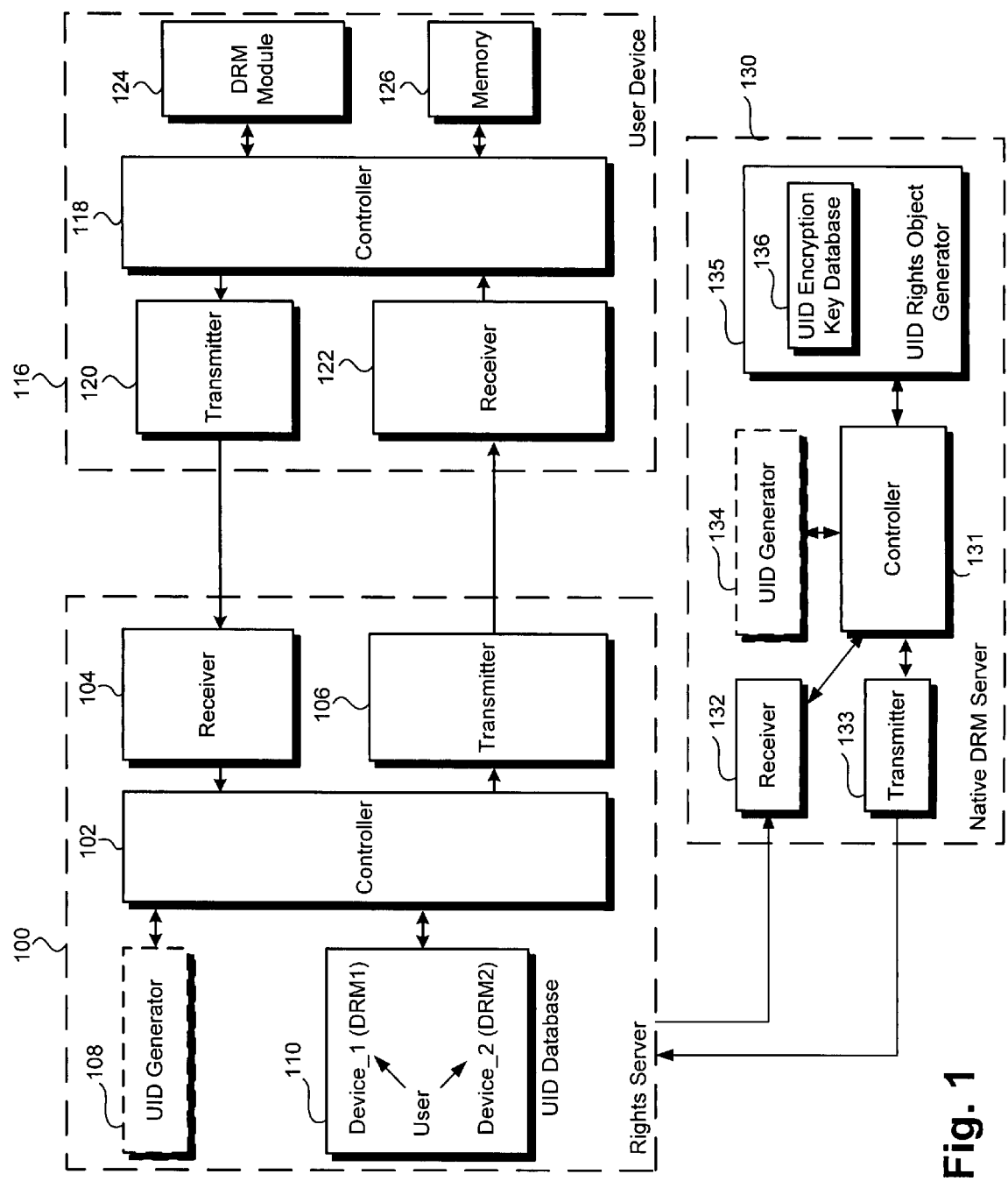
FIG. 1 illustrates a block diagram of a system for identifying a device implementing a DRM protocol, in accordance with one embodiment of the invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a block diagram of rights server 100 for identifying user device 116 implementing a DRM protocol and authorizing the use of digital content protected by a DRM protocol. Rights server 100 includes controller 102, receiver 104, transmitter 106, and unique identification database 110 (hereinafter "UID database 110"). Optionally, in one embodiment, rights server 100 also includes unique identification generator 108 (hereinafter "UID generator 108"). The unique identification can be, for example, a number or an alphanumeric string. As described below, such a unique identification can be advantageously used by rights server 100 to identify and authenticate user device 116. Moreover, by determining the unique identification of each user device 116 communicating with rights server 100, the user devices belonging to the same consumer or user can be advantageously determined. As such, more flexible licenses can be generated for the content, which can enable a consumer to conveniently share the content among her various devices to improve consumer experience.

As shown in FIG. 1, controller 102 in rights server 100 is coupled to receiver 104, transmitter 106, UID generator 108 and UID database 110. Controller 102 can be, for example, a microprocessor or a central processing unit ("CPU"). In one embodiment, receiver 104 and transmitter 106 can be implemented using a network interface, such as a Wi-Fi interface, a Bluetooth interface, an Ethernet interface, or any other type of network communication interface. As also shown in FIG. 1, rights server 100 is in communication with user device 116 over a packet network, such as the Internet.

User device 116 in FIG. 1 includes controller 118, transmitter 120, receiver 122, DRM module 124, and memory 126. Controller 118 can be a CPU, and transmitter 120 and receiver 122 can be implemented using a network interface, such as a Wi-Fi interface, a Bluetooth interface, an Ethernet interface, or any other type of network communication interface. User device 116 can be, for example, an electronic device, such as a personal computer, a personal digital assistant ("PDA"), an MP3 player, or a cellular telephone. Accordingly, user device 116 can be configured to receive and display various types of content, such as text, images, videos, or music.

As shown in FIG. 1, rights server 100 is also in communication with native DRM server 130 over a packet network, such as the Internet. Native DRM server 130 includes controller 131, transmitter 133, receiver 132, and unique identification rights objects generator 135 (hereinafter "UID rights object generator 135"), which includes UID encryption key database 136. Optionally, in one embodiment, native DRM server 130 also includes unique identification generator 134 (hereinafter "UID generator 134"). Controller 131 can be a CPU, and transmitter 133 and receiver 132 can be implemented using a network interface, such as a Wi-Fi interface, a Bluetooth interface, an Ethernet interface, or any other type of network communication interface.

In one embodiment, the content is protected by a content provider using a DRM protocol, such as Open Mobile Alliance Digital Rights Management ("OMADRM") or Windows Media Digital Rights Management ("WMDRM").

To display a protected content, user device 116 may be required to separately acquire a license from rights server 100. In one embodiment, the license can specify the allowable uses for the content and can include an encryption key for decrypting the content. DRM module 124 in user device 116 is configured to implement a DRM protocol for acquiring a license and for rendering the protected content to allow device 116 to use the content. DRM module 124 can be implemented, for example, in software or in hardware. In one embodiment, DRM module 124 can be configured to request a license when user device 116 initially attempts to use the content. For example, DRM module 124 can be configured to transmit a communication to rights server 100, such as license request, when user device 116 initially attempts to use the protected content. As shown in FIG. 1, rights server 100 can receive the license request at receiver 104.

Figure 2:
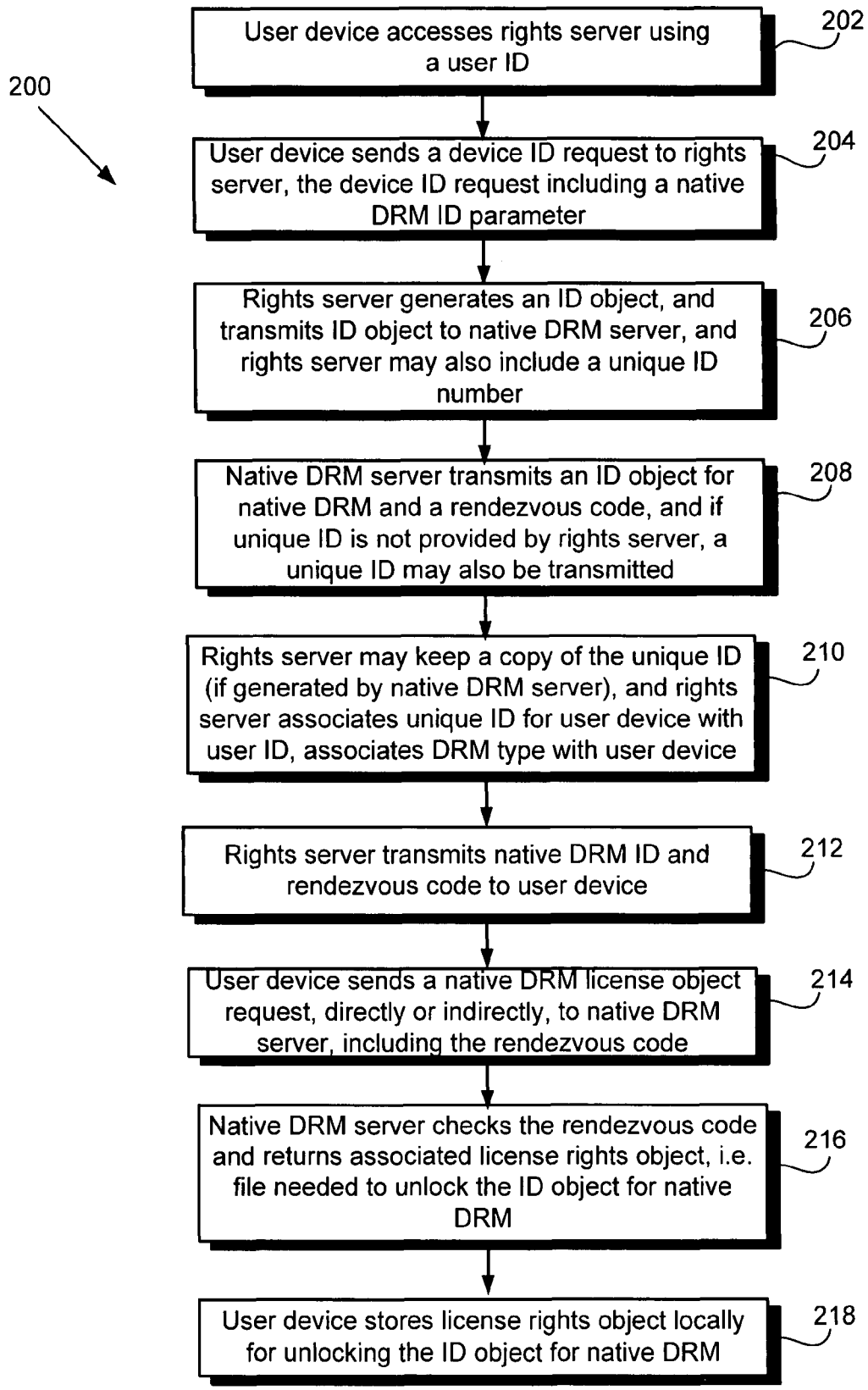
FIG. 2 illustrates a flowchart for performing a method for configuring a device implementing a DRM protocol, in accordance with one embodiment of the invention.

Turning to FIG. 2, configuration method 200 for configuring user device 116 is described in conjunction with FIG. 1, in accordance with one embodiment of the invention. As shown in FIG. 2, configuration method 200 starts at step 202, where user device 116 accesses rights server 100 using a user ID. Next, at step 204, transmitter 120 of user device 116 transmits a device ID request for association with user device 116 to receiver 104 of rights server 100. In one embodiment, the device ID request includes a native DRM ID parameter indicative of the DRM protocol utilized by user device 116. In response, at step 206, rights server 100 generates an ID object, and transmitter 106 of rights server 100 transmits the ID object to receiver 132 of native DRM server 130. The ID object can be, for example, an extensible markup language ("XML") document. Optionally, at step 206, UID generator 108 of rights server 100 may also generate a unique ID number, and transmitter 106 may transmit the unique ID number to native DRM server 130 for user device 116.

Next, at step 208, controller 131 of native DRM server 130 utilizes the ID object to generate an ID object based on native DRM or the DRM supported by user device 116, and further generate a rendezvous code for later use by user device 116, as explained below. If native DRM server 130 does not receive a unique ID number from rights server 100 at step 206, controller 131 of native DRM server 130 also generates a unique ID number, and transmitter 133 may transmit the unique ID number to rights server 100. The ID object based on native DRM may include the unique ID number, which transmitter 133 transmits to rights server 100. At step 210, controller 102 of rights server 100 may store the unique ID received from native DRM server 130 in UID database 110 and associate user device 116 with the unique ID and the DRM protocol type of user device 116 in UID database 110. For example, as shown in FIG. 1, for the first user device, user and/or user ID is associated with the first user device (or Device_1) and the first DRM protocol type (or DRM1), and for the second user device, user and/or user ID is associated with the second user device (or Device_2) and the second DRM protocol type (or DRM2). Therefore, unlike the conventional systems, an embodiment of the present invention provides a system, where multiple non-compatible DRMs can be supported, and even more, multiple non-compatible DRMs can be used by a single user using a number of different user devices. For example, a user may have two user devices each using a different DRM protocol family, which are incompatible, and rights server 100 of the present invention provides UID database 110 to associate the user with two different user devices, where each device utilizes a different DRM protocol.

Continuing with step 212, transmitter 106 of rights server 100 transmits the ID object for the native DRM and the rendezvous code to user device 116. Next, at step 214, controller 118 of user device 116 generates a native DRM license object request including the rendezvous code, which transmitter 120 of user device 100 transmits directly to native DRM server 130, or indirectly, such as through rights server 100 to native DRM server 130. Upon receipt of native DRM license object request including the rendezvous code by native DRM server 130 at step 216, controller 131 of native DRM server 130 checks the rendezvous code to determine validity, and if valid, controller 131 of native DRM server 130 generates a license rights object, and transmitter 133 transmits the license rights object to user device 116 directly or indirectly. The license rights object provides a key needed for unlocking or decrypting the ID object for native DRM. At step 218, receiver 122 of user device 116 receives the license rights object and stores the license rights object in memory 126 for unlocking the ID object for native DRM.

FIG. 3 illustrates validation method 300 for validating user device 116, which is described in conjunction with FIG. 1, in accordance with one embodiment of the invention. At step 302, controller 118 of user device 116 generates a license use request, and transmitter 120 of user device 116 transmits the license use request to rights server 100. Upon receipt of the license use request by receiver 104 of rights server 100, at step 304, controller 102 of rights server 100 generates a nonce challenge, and transmitter 106 of rights server 100 transmits the nonce challenge to user device 116. Upon receipt of the nonce challenge by receiver 122 of user device 116, at step 306, controller 118 of user device 116 unlocks the ID object for native DRM using the license rights object to access the contents of the ID object for native DRM. Next, controller 118 of user device 116 calculates a pre-determined function, such as a hash function, based on the nonce challenge and the contents of the ID object for native DRM to generate a user device function result. For example, in one embodiment, the nonce challenge may be XORed with the contents of the ID object for native DRM. Further, at step 306, transmitter 120 of user device 116 transmits the ID object for native DRM and user device function result to rights server 100.

At step 308, upon receipt of the ID object for native DRM and user device function result by receiver 104 of rights server 100, transmitter 106 of rights server 100 transmits the ID object for native DRM to native DRM server 130. At step 310, upon receipt of the ID object for native DRM by receiver 132 of native DRM server 130, controller 131 of native DRM server 130 unlocks the ID object for native DRM using the license rights object to access the contents of the ID object for native DRM, and transmitter 133 of native DRM server 130 transmits the contents of the ID object for native DRM to rights server 100.

At step 312, upon receipt of the contents of the ID object for native DRM by receiver 102 of rights server 100, controller 102 of rights server 100 calculates the pre-determined function, such as a hash function, based on the nonce challenge and the contents of the ID object for native DRM to generate a rights server function result. For example, in one embodiment, the nonce challenge may be XORed with the contents of the ID object for native DRM. Further, at step 314, controller 102 of rights server 100 compares the user device function result and the rights server function result to validate access by user device 116. At step 316, if the user device function result is the same as the rights server function result, access by user device 116 is granted, and conversely, if the user device function result does not match the rights server function result, access by user device 116 is denied.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a system for digital rights management ("DRM") of a plurality of user devices, the method comprising:
receiving a user ID associated with a user for accessing the system through a first user device;
receiving a first device ID request from the user for registration of the first user device;
generating a first unique identification number for the first user device;
generating a first unique identification object based on a first DRM protocol, wherein the first unique identification object is a first document that includes the first unique identification number;
associating the user with the first user device, the first unique identification number and the first DRM protocol;
receiving the user ID associated with the user for accessing the system through a second user device;
receiving a second device ID request from the user for registration of the second user device;
generating a second unique identification number for the second user device;
generating a second unique identification object based on a second DRM protocol, wherein the second unique identification object is a second document that includes the second unique identification number, and wherein the first DRM protocol and the second DRM protocol are incompatible; and
associating the user with the second user device, the second unique identification number and the second DRM protocol.

2. The method of claim 1 further comprising:
transmitting the first unique identification object to the first user device.

3. The method of claim 2 further comprising:
receiving the first unique identification object from the first user device;

receiving a first result of a function applied to the first unique identification number;

unlocking the first unique identification object;

applying the function to a content of the first unique identification object to obtain a second result;

comparing the first result with the second result;

approving access to the first user device if the comparing matches the first result with the second result.

4. The method of claim 3, wherein the first unique identification object is encrypted with a unique identification encryption key, and wherein unlocking the first unique identification object includes using the unique identification encryption key.

5. The method of claim 1 further comprising:

receiving a DRM license object request from the first user device;

verifying the first user device; and transmitting a DRM license object to the first user device for unlocking the first unique identification object.

6. The method of claim 5, wherein the first unique identification object is encrypted with a unique identification encryption key, and wherein DRM license object includes the unique identification encryption key.

7. The method of claim 5, wherein prior to receiving the DRM license object request, the method comprises:

transmitting the first unique identification object to the first user device; and transmitting a rendezvous code to the first user device.

8. The method of claim 7 further comprising:

receiving the rendezvous code from the first user device;

wherein the verifying includes confirming the rendezvous code.

9. The method of claim 1, wherein the first DRM protocol is an Open Mobile Alliance Digital Rights Management ("OMADRM") protocol and the second DRM protocol is a Windows Media Digital Rights Management ("WMDRM") protocol.

10. The method of claim 1 wherein the first user device is an MP3 player and the second user device is a cellular telephone.

11. The method of claim 1, wherein the first document is an extensible markup language (XML) document.

12. A system for digital rights management ("DRM") of a plurality user devices, the system comprising:

a receiver configured to receive a user ID associated with a user for accessing the system through a first user device, the receiver further configured to receive a first device ID request from the user for registration of the first user device;

a controller configured to associate the user with the first user device, a first unique identification number and a first DRM protocol, wherein the first unique identification number is generated for the first user device, and a first unique identification object based on a first DRM protocol is generated, wherein the first unique identification object is a first document that includes the first unique identification number;

the receiver further configured to receive the user ID associated with the user for accessing the system through a second user device, and the receiver further configured to receive a second device ID request from the user for registration of the second user device;

the controller further configured to associate the user with the second user device, the second unique identification number and the second DRM protocol, wherein the second unique identification number is generated for the second user device, and a second unique identification object based on a second DRM protocol is generated, wherein the second unique identification object is a second document that includes the second unique identification number, and wherein the first DRM protocol and the second DRM protocol are incompatible.

13. The system of claim 12 further comprising:

a transmitter configured to transmit the first unique identification object to the first user device; wherein the system is a rights server and the first unique identification object is generated by a DRM server in communication the rights server.

14. The system of claim 13 further comprising:

the receiver configured to receive the first unique identification object from the first user device, and further configured to receive a first result of a function applied to the first unique identification number;

the controller further configured to unlock the first unique identification object, and further configured to apply the function to a content of the first unique identification object to obtain a second result, and further configured to compare the first result with the second result and approve access to the first user device if comparing matches the first result with the second result.

15. The system of claim 14, wherein the first unique identification object is encrypted with a unique identification encryption key, and wherein the controller unlocks the first unique identification object using the unique identification encryption key.

16. The system of claim 12 further comprising:

the receiver further configured to receive a DRM license object request from the first user device;

the controller further configured to verify the first user device; and a transmitter configured to transmit a DRM license object to the first user device for unlocking the first unique identification object.

17. The system of claim 16, wherein the first unique identification object is encrypted with a unique identification encryption key, and wherein DRM license object includes the unique identification encryption key.

18. The system of claim 16 wherein prior to the receiver receiving the DRM license object request, the transmitter is further configured to transmit the first unique identification object to the first user device, and transmit a rendezvous code to the first user device.

19. The system of claim 18, wherein the receiver is further configured to receive the rendezvous code from the first user device, and wherein verification by the controller includes confirming the rendezvous code.

20. The system of claim 12, wherein the first DRM protocol is an Open Mobile Alliance Digital Rights Management ("OMADRM") protocol and the second DRM protocol is a Windows Media Digital Rights Management ("WMDRM") protocol.

21. The system of claim 12, wherein the first user device is an MP3 player and the second user device is a cellular telephone.

22. The system of claim 12, wherein the first document is an extensible markup language (XML) document.

* * * * *

UNITED STATES PATENT AND TRADEMARK OFFICE
CERTIFICATE OF CORRECTION

PATENT NO. : 7,870,273 B2  
APPLICATION NO. : 11/906139  
DATED : January 11, 2011  
INVENTOR(S) : Watson et al.

Page 1 of 1

It is certified that error appears in the above-identified patent and that said Letters Patent is hereby corrected as shown below:

On the Title Page Item (54) and in the Specification Col. 1, line 2, in the title, "INDENTIFYING" should be --IDENTIFYING--.

On the Title Page Item (57) in the abstract, line 11, "he" should be --be--.

On the Title Page Item (57) in the abstract, line 12, "Using" should be --using--.

Signed and Sealed this  
Seventh Day of January, 2014

Margaret A. Focarino  
*Commissioner for Patents of the United States Patent and Trademark Office*